United States Patent [19]
Saigusa et al.

[11] Patent Number: 5,812,198
[45] Date of Patent: Sep. 22, 1998

[54] VIDEO CODING DECODING APPARATUS

[75] Inventors: Masahito Saigusa; Toshio Miki, both of Yokohama, Japan

[73] Assignee: NTT Mobile Communications Network, Inc., Japan

[21] Appl. No.: 532,723

[22] PCT Filed: May 26, 1995

[86] PCT No.: PCT/JP95/01019

§ 371 Date: Sep. 30, 1996

§ 102(e) Date: Sep. 30, 1996

[87] PCT Pub. No.: WO95/33341

PCT Pub. Date: Dec. 7, 1995

[30] Foreign Application Priority Data

May 30, 1994 [JP] Japan ................................ 6-139438

[51] Int. Cl.$^6$ ............................................. H04N 7/32
[52] U.S. Cl. ................... 348/416; 348/699; 348/845.1
[58] Field of Search ................................ 348/402, 407, 348/413, 416, 699, 700, 845.1; 382/243, 242, 236, 238; H04N 7/32

[56] References Cited

U.S. PATENT DOCUMENTS

| | | | |
|---|---|---|---|
| 4,651,206 | 3/1987 | Ohki ........................................ | 348/416 |
| 5,057,916 | 10/1991 | Krause et al. ........................... | 348/416 |
| 5,369,437 | 11/1994 | Koga et al. .............................. | 348/401 |
| 5,424,777 | 6/1995 | Koga et al. .............................. | 348/402 |
| 5,592,228 | 1/1997 | Dachiku et al. ......................... | 348/699 |
| 5,598,215 | 1/1997 | Watanabe ................................. | 348/416 |
| 5,631,975 | 5/1997 | Riglet et al. ............................. | 382/173 |

FOREIGN PATENT DOCUMENTS

| | | | |
|---|---|---|---|
| 63-267080 | 11/1988 | Japan ............................... | H04N 7/13 |
| 5-252506 | 9/1993 | Japan ............................... | H04N 7/32 |

OTHER PUBLICATIONS

Choi et al., "Analysis and Synthesis of Facial Expressions in Knowledge–Based Coding of Facial Image Sequences", ICASSP, pp. 2737–2740, Jul. 1991.

Dixit et al., "A Variable Bit Rate Layered DCT Video Coder for Packet Switched (ATM) Networks", ICASSP, pp. 2253–2256, Feb. 1990.

Primary Examiner—Tommy P. Chin
Assistant Examiner—Vu Le
Attorney, Agent, or Firm—John T. Johnson; Rogers & Wells LLP

[57] ABSTRACT

This invention relates to a video coding decoding apparatus for effectively refreshing a video and for recovering degradation of a video caused by code error, in a short time. A video coding decoding apparatus according to the present invention comprises area shape detection (12) for dividing the picture in the single frame into a motion compensation area and the remaining area and then detecting a shape of the motion compensation area by distinguishing between the motion compensation area and the remaining area, and motion vector estimation (14) for estimating a resultant motion vector of the overall motion compensation area from a motion vector of each block in the motion compensation area. A refreshing operation is carried out from a starting point of the estimated resultant motion vector towards the direction of the estimated resultant motion vector in a motion compensation area. When a code error has occurred, code error block number informing circuit (13) informs the number of the block where the code error has occurred. The starting point of the refreshing operation is a block which, among many other adjacent blocks to the informed block, is located in an opposite direction with respect to the estimated motion vector. For this reason, a video can be refreshed effectively and degradation of a video caused by code error, can be recovered in a short time.

5 Claims, 3 Drawing Sheets

VIDEO CODING DECODING APPARATUS

TECHNICAL FIELD

This invention relates to a video coding decoding apparatus which is capable of effectively refreshing a picture and recovering degradation of a picture caused by code error, in a short time.

BACKGROUND ART

Heretofore, there is known a system, as a technique for coding a video, in which a picture in a single frame is divided into blocks of M×N (where M and N are natural numbers, respectively). In the technique, data showing the frame, data showing the number of each block and data of a picture belonging to the blocks are coded in a hierarchical structure, and those data are coded by means of a two-dimensional discrete cosine transform (DCT) and a Huffman code (ITU-T Recommendation H. 261). If, at that time, a motion on each block in the continuous inter-frames is estimated, data can be coded in an efficient manner by compensating the motion from a reference data and without coding all of the picture data.

Here, in the example shown in FIG. 1, the block numbers are assigned such that a number assigned to a block located on a left upper end of the explanatory view is "1" and the numbers are gradually sequentially increased toward the right of the same horizontal row. When a block located on the right extremity of the row is reached, a new row is started and a new block number is assigned to each block on this new row from left to right in the same manner as the first row. It should be noted that FIG. 1 shows only one example showing a way for assigning block numbers and any other suitable way for assigning block numbers may be employed in accordance with necessity. In a video coding decoding apparatus in which the above-mentioned coding system is employed, a refreshing operation is carried out in a sequential order of the block numbers for each frame (see arrows of the broken lines). Presuming that the number of a block in which a refreshing operation is carried out in an i-th frame is "1", the number of another block in which a refreshing operation is carried out in the subsequent (i+1)-th frame is "2". It should be noted that such a refreshing operation is carried out on a premise that a communication line, in which a transmission error is negligible, is employed and no consideration is given to a possible degradation caused by code error.

However, in the event that a code error has occurred in an area where a motion compensation is being carried out and this particular area is not to be refreshed in the subsequent frame, degradation of a picture is accumulated without being recovered even when no code error has occurred in the above-mentioned subsequent frame. Consequently, in accordance with the conventional refreshing operation, once a picture degradation occurs, it takes about several dozens of seconds to recover the picture from degradation in the worst case.

DISCLOSURE OF INVENTION

The present invention has been accomplished in view of the above-mentioned problems. It is, therefore, an object of the invention to provide a video coding decoding apparatus in which a refreshing operation for recovering degradation of a picture caused by code error can be carried out efficiently.

In order to achieve the above object, there is provided a video coding decoding apparatus in which a picture in a single frame is divided into blocks of M×N (where M and N are natural numbers) and in which an interframe motion compensation prediction is carried out, the video coding decoding apparatus comprising:

area shape detecting means for dividing the picture in a single frame into a motion compensation area and the remaining area and then detecting a shape of the motion compensation area by distinguishing between the motion compensation area and the remaining area;

motion vector estimating means for estimating a motion vector of the overall motion compensation area from a motion vector in the motion compensation area; and refreshing means for carrying out a refreshing operation from a starting point of the estimated motion vector toward the motion vector, in the motion compensation area.

According to the present invention, a motion compensation area in a video in a single frame is detected by the area shape detecting means, a motion vector (moving direction) of the overall motion compensating area is estimated from motion vector of each block in the motion compensation area by the motion vector estimating means, and a refreshing operation is carried out from a starting point of the estimated motion vector toward the estimated motion vector (moving direction). Consequently, since the picture in the motion vector compensation area is gradually refreshed toward the motion vector, it becomes natural. Further, since no refreshing operation is carried out with respect to a static area disposed in an opposite direction to the motion vector, a refreshing operation can be carried out in an efficient manner.

Furthermore, according to the present invention, the apparatus further comprises code error block number (where code error block number is a number of the block to which code error occurred) informing means for informing a number of the block where a code error has occurred, and a block which, among many other adjacent blocks to that block which is informed by the block number informing means, is located in an opposite direction with respect to the estimated motion vector, is served as the starting point for the refreshing operation. Accordingly, when a code error has occurred to a block in the motion compensating area, a refreshing operation is carried out from this way of the block toward the estimated motion vector. Consequently, degradation of a picture caused by code error can be recovered rapidly.

Moreover, according to the present invention, the apparatus further comprises refreshing range control means for limiting the refreshing range to a range of blocks belonging to the motion compensation area. Accordingly, since the range of a refreshing operation is limited only to the motion compensation area. Consequently, a refreshing operation can be omitted with respect to those blocks which are located outside of the motion compensation area, or those blocks disposed in a static area. For this reason, a refreshing operation can be carried out more efficiently.

BEST MODE FOR CARRYING OUT THE INVENTION

Figure 1:
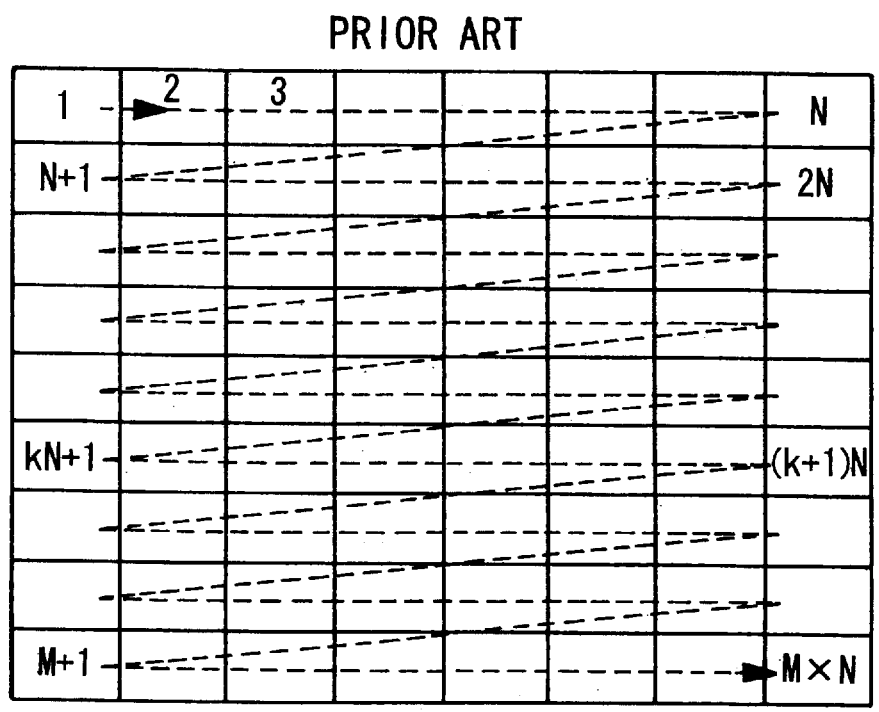
FIG. 1 is an explanatory view for explaining a conventional refreshing procedure.
Figure 2:
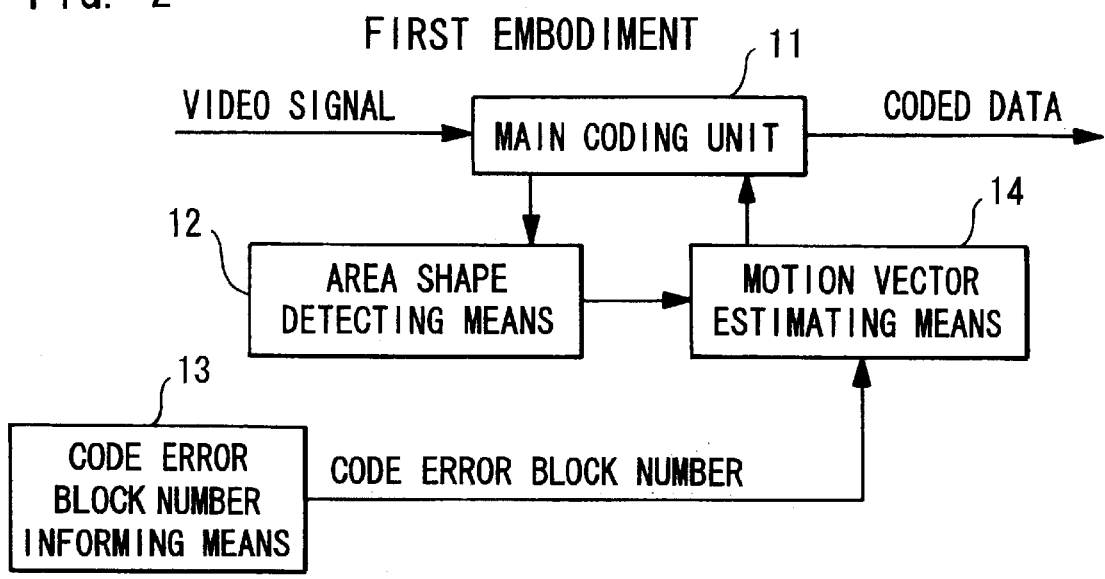
FIG. 2 is a block diagram showing a construction of a video coding decoding apparatus according to a first embodiment of the present invention.

A video coding decoding apparatus according to a first embodiment of the present invention will be described hereinafter with reference to the drawings. FIG. 2 is a block diagram showing a construction of this embodiment. In this illustration, reference numeral 11 denotes a main coding unit for carrying out a two-dimensional discrete cosine transform (DCT) with respect to a prediction error occurrable when a motion inter-frame prediction is carried out in blocks having a size of n×n (n is a natural number) and coding a transfer coefficient thereof. It is presumed here that a picture in a single frame is constituted of blocks of M×N (see FIGS. 1, 5 and 6). Also, this main coding unit 11 is operated to refresh blocks of those block numbers received, as later described.

Figure 3:
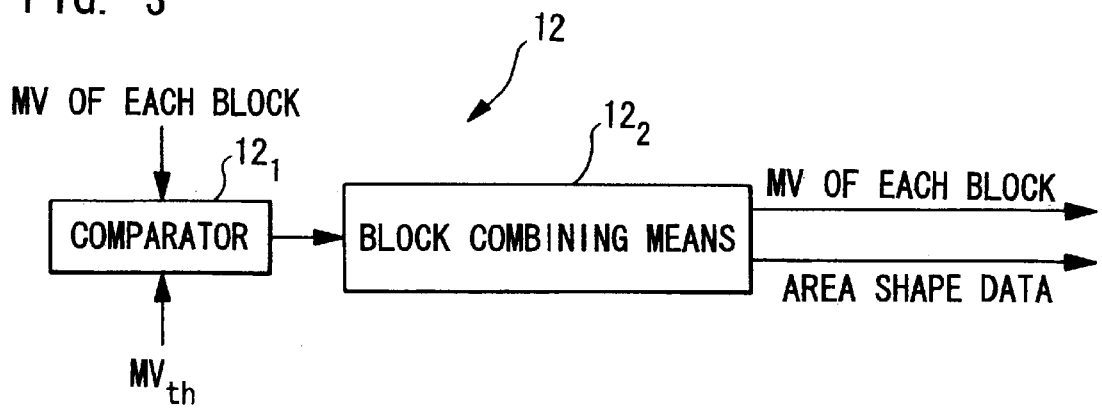
FIG. 3 is a block diagram showing a construction of an area shape detecting means for the video coding decoding apparatus according to the first embodiment of the present invention.

Reference numeral 12 denotes an area shape detecting means for dividing a picture in a single frame into a range of a motion compensation area and the remaining area and then distinguishing a shape of the motion compensation area by distinguishing the motion compensation area from the remaining area. A construction of the area shape detecting means is shown in FIG. 3. In this illustration, a comparator $12^1$ compares a pre-established threshold MVth with a magnitude of a motion vector MV of each block supplied by the main coding unit 11 and extracts a block or blocks having a motion vector MV of a magnitude equal to or more than the pre-established threshold MVth (which block or blocks are to be subjected to motion compensation).

This will be described in more detail. In the case where a magnitude of the motion vector is coded in two-dimension consisting of a horizontal direction and a vertical direction, it is presumed that a motion vector having a block number of "n" can be expressed as follows.

$$MV_n = (x_n, y_n)$$

If the magnitude of this motion vector is represented by MVd(n), the same can be expressed as follows.

$$MV_d(n) = \sqrt{x_n^2 + y_n^2}$$

This MVd(n) is obtained for each block and compared with the threshold MVth, thereby to obtain a block or blocks to be subjected to motion compensation.

For making a judgment, a microscopic motion is basically disregarded and a macroscopic motion such as, for example, a motion of a figure moving in front of a fixed background, is detected as a moving direction of a motion vector of the overall motion area.

Then, the block combining means $12_2$ combines the blocks extracted by the comparator $12_1$ into a single area (unitary area) and outputs data about the area shape together with the motion vector MV of each block.

Referring back to FIG. 2, reference numeral 13 denotes a code error block number informing means for outputting the numbers of blocks which could not be decoded due to occurrence of a code error. The code error block number informing means is disposed on a receiving side. It should be noted that this informative data may be transmitted by multiplexing the related data on a coded data.

Figure 4:
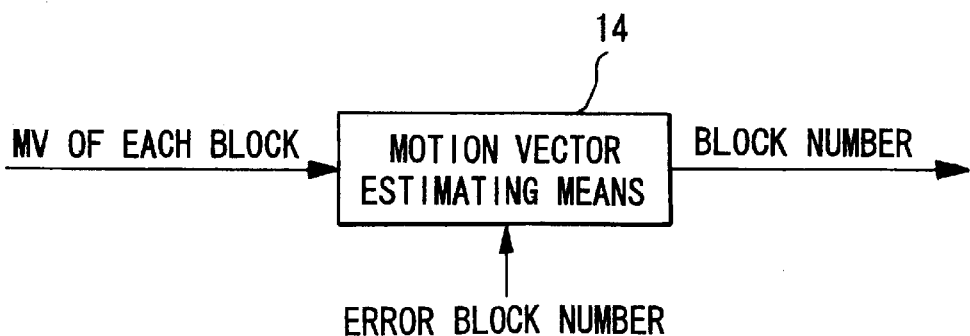
FIG. 4 is a block diagram showing a construction of a motion vector estimating means for the video coding decoding apparatus according to the first embodiment of the present invention.

Reference numeral 14 denotes a motion vector estimating means. As shown in FIG. 4, as well as elsewhere, the motion vector estimating means 14 combines various motion vectors in a motion compensation area detected by the area shape detecting means 12 and estimates a motion vector of the specific area as a whole. Upon input of an area shape data by the area shape detecting means 12 and a code error block number by the code error block number informing means 13, the motion vector estimating means 14 makes a judgment as to which area the block specified by the above number belongs to. If the specific area belongs to the motion compensation area, the motion vector estimating means 14 outputs the number of that block which, among error-occurred blocks in the motion compensation area, is located in the direction of a starting point in the sense of a motion vector (moving direction). In contrast, if the block, in which a code error has occurred, is outside the motion compensation range or if the block belongs to a static area, the motion vector estimating means 14 outputs the number of the block in which the code error has occurred.

Next, operation of the above-mentioned embodiment will be described. First, there will be described operation when no code error has occurred. The motion vector MV of each block is extracted from a received video signal by the main coding unit 11. The motion vector MV of each block is compared with the threshold MVth by the comparator $12_1$ of the area shape detecting means 12. Then, the blocks having a motion vector MV equal to or more than the threshold are combined by the block combining means $12_2$. By doing this, a range of blocks having a motion vector equal to or more than the threshold MVth, i.e., a motion area to be subjected to motion compensation, is detected. Subsequently, the motion vectors of the individual blocks are composed. By doing this, the motion vector of the overall motion compensation area is estimated by the motion vector estimating means 14.

Figure 5:
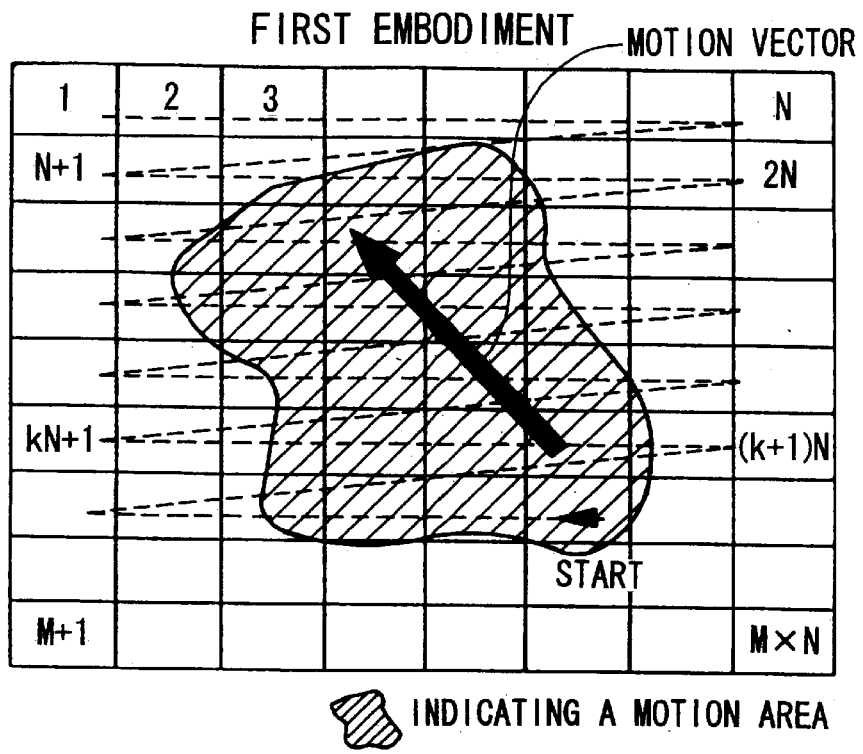
FIG. 5 is an explanatory view showing a refreshing procedure for the video coding decoding apparatus according to the first embodiment of the present invention.

Here, as is shown in FIG. 5, the motion area to be subjected to motion compensation is widely spread and the estimated motion vector is likely to be a direction indicated by a bold arrow. In this case, the motion vector estimating means 14 supplies the block numbers one after another to the main coding unit 11 for each frame in a direction indicated by a broken line arrow so that a refreshing operation can be carried out from the block located in the motion area but in the most opposite direction with respect to the estimated motion vector (i.e., block located at the starting point of the estimated motion vector (namely, block indicated by START in FIG. 5)) toward the estimated motion vector. By this, the main coding unit 11 carries out a refreshing operation for each frame, one after another, with respect to the blocks corresponding to the block numbers supplied by the motion vector estimating means 14.

As a consequence, since the picture in the motion area is gradually refreshed from the starting point, it becomes natural. Further, since no refreshing operation is carried out with respect to the block or blocks located in an opposite direction to the motion vector and in the static area, a refreshing operation can be carried out in an efficient manner.

Next, there will be described an operation when a code error has occurred to the received coded data. The numbers of the blocks, in which a code error has occurred but in which decoding was failed to carry out, are informed by the code error block number informing means 13. Then, the motion vector estimating means 14 makes a judgment as to which area the blocks of the informed block numbers belong to. When the blocks of the informed block numbers are located in the motion compensation area, the motion vector estimating means 14 outputs the number of the block which, among many other adjacent blocks adjacent to the informed blocks, is situated in an opposite (starting point) direction with respect to the motion vector, as the starting point for a refreshing operation. The blocks to be subsequently subjected to refreshing operation are the same as the above-mentioned case where no code error has occurred, in the respect that the blocks to be subsequently subjected to refreshing operation are to be refreshed in the motion vector (moving direction).

On the other hand, when the blocks, in which a code error has occurred, are outside the motion compensation area or belong to the static area, the motion vector estimating means 14 outputs the numbers of the blocks so that the very blocks of the informed block numbers are refreshed. Thereafter, the motion vector estimating means 14 successively outputs the block numbers so that refreshing operation is continuously carried out in the direction of the motion vector.

As seen, when a block, in which a code error has occurred, belongs to the motion compensation area, a refreshing operation is carried out from this way of the block in the estimated motion direction. When the block, in which a code error has occurred, is outside the motion compensation area or belongs to the static area, this block is immediately refreshed. Accordingly, there can be obtained a rapid recovery of a video from degradation caused by code error.

A second embodiment of the present invention will now be described. In the above-mentioned first embodiment, the refreshing operation is carried out only in the estimated motion vector. The second embodiment is the same as the first embodiment in the respect that the starting point of the estimated motion vector is served as a starting point for the refreshing operation. The second embodiment is characterized in that the refreshing operation to be carried out in the estimated motion vector is limited to those blocks including or belonging to the motion compensation area. This is made possible for the motion vector estimating means 14 by outputting the numbers of blocks located in the motion compensation area after it outputs the block number serving as a starting point for the refreshing operation. At that time, the area shape data detected by the area shape detecting means 12 is utilized.

Figure 6:
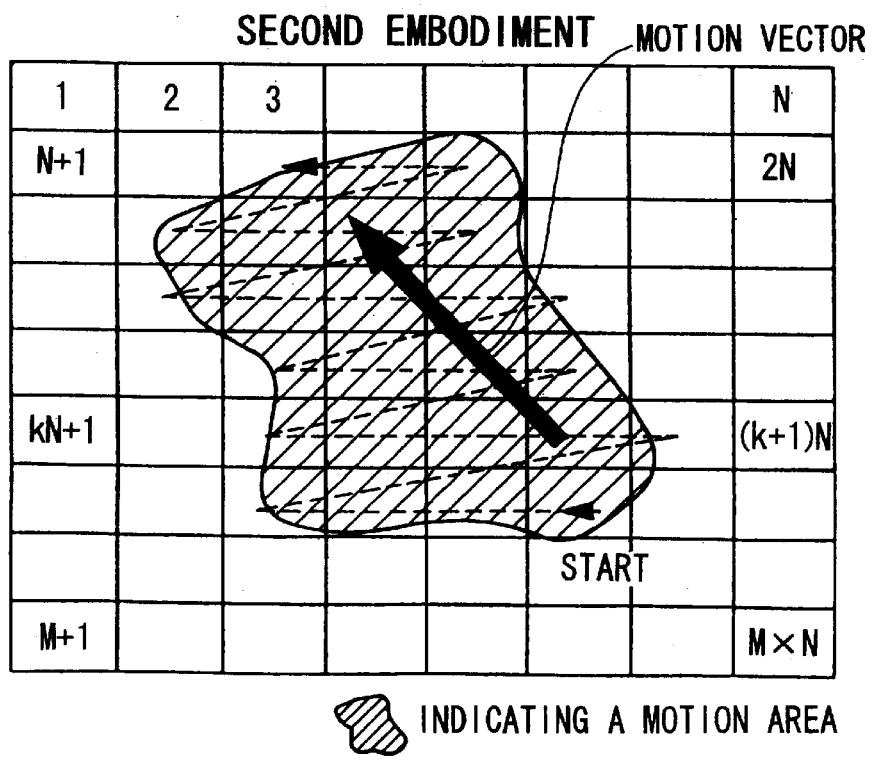
FIG. 6 is an explanatory view showing a refreshing procedure for a video coding decoding apparatus according to the present invention.

In this case, a refreshing operation is carried out in the sequential order as indicated by the broken lines of FIG. 6. Owing to this arrangement, those blocks in the static area are not subjected to refreshing operation and only those blocks belonging to the motion area are subjected to refreshing operation. Accordingly, a refreshing operation can be carried out in a very efficient manner. It should be noted that an arrangement is also possible in this second embodiment that in case of an occurrence of a code error, when the code error has occurred in the motion compensation area, the number of the block which, among many other blocks adjacent to the blocks where an code error has occurred and which is located in the direction of a starting point in the sense of a motion vector (moving direction), is output and when the blocks, in which a code error has occurred, are outside the motion compensation area or belong to the static area, the number of the error-occurred blocks are output.

INDUSTRIAL APPLICABILITY

The present invention is suited to be applied to a case where data of a video having a comparatively gentle motion is transmitted in a two-way communications by a code error inherent communication system such as, for example, a digital mobile communication system. In the future, the present invention is believed to be applicable to a mobile video telephone, a video conference system, and the like.

We claim:

1. A video coding/decoding apparatus of which a picture in a single frame is divided into blocks of M×N (where M and N are natural numbers) and in which an interframe motion compensation prediction is carried out, said video coding decoding apparatus comprising:

area shape detecting means for dividing the picture of a single frame into a motion compensation area and the remaining area and then detecting a shape of said motion compensation area by distinguishing between said motion compensation area and said the remaining area;

motion vector estimating means for estimating a resultant motion vector of the overall motion compensation area from a motion vector of each block in said motion compensation area; and refreshing means for carrying out a refreshing operation from a starting point of said estimated resultant motion vector towards the direction of said estimated resultant motion vector, in said motion compensation area.

2. A video coding/decoding apparatus according to claim 1, further comprising a refreshing range control means for limiting a range of said refreshing operation to a range of said motion compensation area.

3. A video coding/decoding apparatus according to claim 1, wherein:

said motion vector estimating means estimates said resultant vector of said overall motion compensation area by combining motion vectors of the respective blocks belonging to said motion compensation area, and said refreshing means refreshes each of said blocks belonging to said motion compensation area for each frame from a starting point of said estimated resultant motion vector towards the direction of said estimated resultant motion vector.

4. A video coding/decoding apparatus according to claim 1, further comprising:

code error block number informing means for informing a number of a block in which a code error has occurred;

a block which, among many other adjacent blocks to that block which is informed by said block number informing means, located in the opposite direction with respect to said estimated resultant motion vector, being served as a starting point for said refreshing operation.

5. A video coding/decoding apparatus according to claim 4, further comprising:

refreshing range control means for limiting a range of the refreshing operation to a range of blocks which belong to said motion compensation area.

* * * * *